United States Patent
Price et al.

(10) Patent No.: US 12,321,380 B2
(45) Date of Patent: Jun. 3, 2025

(54) AUTOMATIC EXTRACTION OF REGIONS OF INTEREST FROM ANNOTATED IMAGES WITH OCCLUDING LABELS

(71) Applicant: Palo Alto Research Center Incorporated, Palo Alto, CA (US)

(72) Inventors: Robert R. Price, Palo Alto, CA (US); Raja Bala, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 417 days.

(21) Appl. No.: 17/860,935

(22) Filed: Jul. 8, 2022

(65) Prior Publication Data

US 2024/0012853 A1 Jan. 11, 2024

(51) Int. Cl.
*G06F 16/583* (2019.01)
*G06F 40/169* (2020.01)
*G06T 7/11* (2017.01)
*G06T 7/12* (2017.01)
*G06T 11/40* (2006.01)

(52) U.S. Cl.
CPC ...... *G06F 16/5846* (2019.01); *G06F 16/5838* (2019.01); *G06F 40/169* (2020.01); *G06T 7/11* (2017.01); *G06T 7/12* (2017.01); *G06T 11/40* (2013.01)

(58) Field of Classification Search
USPC ......................................................... 382/190
See application file for complete search history.

(56) References Cited

U.S. PATENT DOCUMENTS

| | | | |
|---|---|---|---|
| 6,594,386 B1 * | 7/2003 | Golshani | G06F 16/5854 708/203 |
| 6,968,085 B2 | 11/2005 | Bern et al. | |
| 2014/0151563 A1 * | 6/2014 | Rousso | G01T 1/1603 250/362 |
| 2018/0068540 A1 * | 3/2018 | Romanenko | H04N 19/137 |

* cited by examiner

*Primary Examiner* — Darryl V Dottin
(74) *Attorney, Agent, or Firm* — Lippes Mathias LLP (57) ABSTRACT

A system and method provide extractions of regions of interest from images hand annotated by reviewers by lifting annotations from images, filtering out text labels, reconstructing continuous closed boundaries, and marking the contained region.

20 Claims, 9 Drawing Sheets

AUTOMATIC EXTRACTION OF REGIONS OF INTEREST FROM ANNOTATED IMAGES WITH OCCLUDING LABELS

BACKGROUND

In computer vision, human expertise is valuable for training machine learning models (e.g., object detection, tumor segmentation, topographical analysis, mechanical part defect detection, . . . etc.) to evaluate images. In some cases, this human expertise or knowledge is used to generate formal symbolic annotations (e.g., coordinates of bounding boxes) which describe the relevant regions or features of images and symbolic labels for these regions. In the real world, however, we sometimes have valuable information contained in images where a human expert has drawn regions and labels directly onto the images. This makes it difficult to extract the human knowledge about regions in a form that can be used to supervise training.

As but one of many examples, it is common practice for radiologists to directly mark up ultrasound or x-ray images and add labels. Simple techniques such as filtering on color do not work to efficiently and effectively extract the human knowledge due to anti-aliasing in the display which mixes foreground and background pixel colors. Filtering also does not help separate region of interest annotations from textual label annotations. Filtering is further deficient in that it fails to deal with the fact that region of interest annotations are not necessarily continuous and perfectly closed by the radiologist making the annotations.

In some cases, ultrasound images with annotations and the same ultrasound images without the annotations are available. In these circumstances, subtraction of the images can be used to lift annotations; however, subtraction does not separate regions of interest from textual labels or have the ability to repair boundaries and fill-in boundaries to create region masks.

In analysis of topographical images or evaluation of images rendering defects in mechanical parts, similar deficiencies would exist where users make annotations on images.

BRIEF DESCRIPTION

In accordance with one aspect of the presently described embodiments, a method to extract annotations from images and separate regions of interest from text labels comprises receiving an image with annotations; extracting items from the image based on a color of the annotations; separating labels from regions of interest in the image; skeletonization of the region of interest boundary; eliminating extraneous components; creating and filling-in a polygon; and outputting the polygon.

In accordance with another aspect of the presently described embodiments, the extracting is accomplished by an excess color filter.

In accordance with another aspect of the presently described embodiments, the separating comprises separating the region of interest and text labels using erosion of region of interest boundary to obtain thick labels followed by subtraction of labels from the annotation.

In accordance with another aspect of the presently described embodiments, the eliminating extraneous components and creating a polygon comprises use of connected components to find large segments of the region of interest and polar sorting with line joining to create a polygon from the segments and fill-in.

In accordance with another aspect of the presently described embodiments, boundaries are reconstructed by finding dead end vertices and then doing bipartite matching between dead ends using a weighted combination of distance and tangent alignment (or other connector features) to close gaps that are close and complementary angles.

In accordance with another aspect of the presently described embodiments, the boundaries are reconstructed using a greedy algorithm.

In accordance with another aspect of the presently described embodiments, the image is an ultrasound image.

In accordance with another aspect of the presently described embodiments, the ultrasound image includes an image of a tumor.

In accordance with another aspect of the presently described embodiments, the image is a satellite image showing a geographic region or topology.

In accordance with another aspect of the presently described embodiments, the image is an image showing a defect in a mechanical part.

In accordance with another aspect of the presently described embodiments, a system comprises at least one processor; and, at least one memory including computer program code; the at least one memory and the computer program code configured to, with the at least one processor, cause the system at least to: receive an image with annotations; extract items from the image based on a color of the annotations; separate labels from regions of interest in the image; skeletonize region of interest boundary to get single pixel wide line; eliminate extraneous components; create and fill-in a polygon; and output the polygon.

In accordance with another aspect of the presently described embodiments, the at least one memory and the computer code are configured to, with the at least one processor, cause the system at least to extract items using an excess color filter.

In accordance with another aspect of the presently described embodiments, the at least one memory and the computer code are configured to, with the at least one processor, cause the system at least to separate the region of interest and text labels using erosion of region of interest boundary to obtain thick labels followed by subtraction of labels from the annotation.

In accordance with another aspect of the presently described embodiments, the at least one memory and the computer code are configured to, with the at least one processor, cause the system at least to eliminate extraneous components and creating a polygon by using connected components to find large segments of the region of interest and polar sorting with line joining to create a polygon from the segments and fill-in.

In accordance with another aspect of the presently described embodiments, the at least one memory and the computer code are configured to, with the at least one processor, cause the system at least to reconstruct boundaries by finding dead end vertices and then doing bipartite matching on a weighted combination of distance and tangent alignment between dead ends to close gaps that are close and complementary angles.

In accordance with another aspect of the presently described embodiments, the at least one memory and the computer code are configured to, with the at least one processor, cause the system at least to reconstruct boundaries by using a greedy algorithm.

In accordance with another aspect of the presently described embodiments, the image is an ultrasound image.

In accordance with another aspect of the presently described embodiments, the ultrasound image includes an image of a tumor.

In accordance with another aspect of the presently described embodiments, the image is a satellite image showing a geographic region or topology.

In accordance with another aspect of the presently described embodiments, the image is an image showing a defect in a mechanical part.

DETAILED DESCRIPTION

Further to the discussion above on images with annotations, to train a segmentation model, it is typically the interior of the boundary that is the region of interest, not the boundary itself. Thus, the textual labels need to be separated from the spatial boundary markings. Thus, according to the presently described embodiments, a pipeline for separating annotations from images and disentangling regions of interest from labels in the annotations is provided.

In this regard, the presently described embodiments use a sequence of image processing operations to isolate the annotation and then separate the region of interest from the label. The region of interest boundary is reconstructed and the region of interest is filled in to create a solid mask suitable for training a network to do semantic segmentation. Alternatively or additionally, the resultant data or mask, could be sent to another downstream system to configured to statistically analyze the data or mask for various metrics, e.g., tumor dimension or size, geographic region topology or dimension or size, or defect size or dimension.

Figure 1:
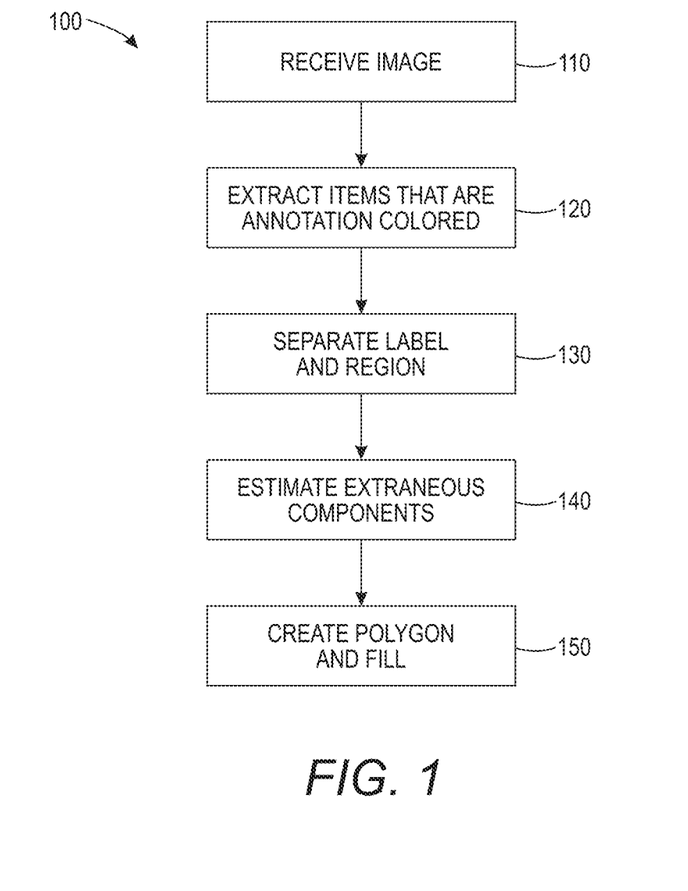
FIG. 1 is a flowchart illustrating an example method according to the presently described embodiments.

With reference to FIG. 1, an example method 100 according to the presently described embodiments is illustrated. In the method 100, an image is received in the system for processing (at 110). This can be accomplished in a variety of manners, largely depending on the implementation and/or environment. Initially, items in the image that are annotation colored are extracted (at 120). This can be accomplished in a variety of manners, including those set forth in connection with FIGS. 3-4 below. Once the annotations are extracted, the label and regions are separated (at 130) using any of a variety of techniques including those techniques described below in connection with FIGS. 5-6. Next, extraneous items are eliminated from the image (at 140). This function should eliminate unwanted noise from the image to enhance the processing. Again, this could be accomplished using a number of techniques, including those described in connection with FIG. 7.

Figure 8:
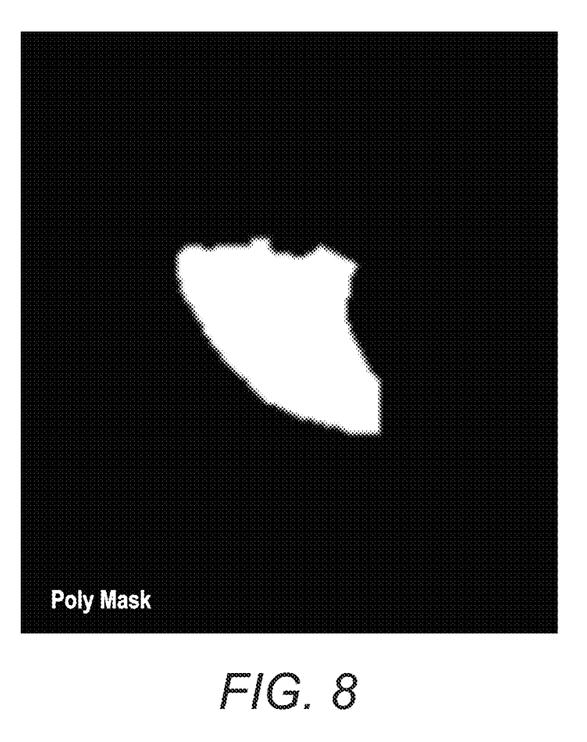
FIG. 8 is an example image illustrating an aspect of the method of FIG. 1.

At this point, a polygon is created and filled-in (at 150). FIG. 8 and its description illustrate one example of how to create a polygon and fill; however, other suitable techniques could also be used.

It will be appreciated by those of skill in the art that the output of the system, e.g., the filled-in polygon, is then provided to a machine learning system, for example, to learn the significance of the shape for a given implementation. For example, the shape may represent the shape of a tumor from an ultrasound image, or the shape of a geographic region or topological feature from a satellite image, or the shape of a defect in a mechanical part. Further, as noted above, as an alternative or an additional feature, the output of the system may be provided to another downstream system to statistically analyze the output for various metrics, e.g., tumor dimension or size, geographic region topology or dimension or size, or defect size or dimension. Other example implementations will also be apparent to those of skill in the art.

Figure 2:
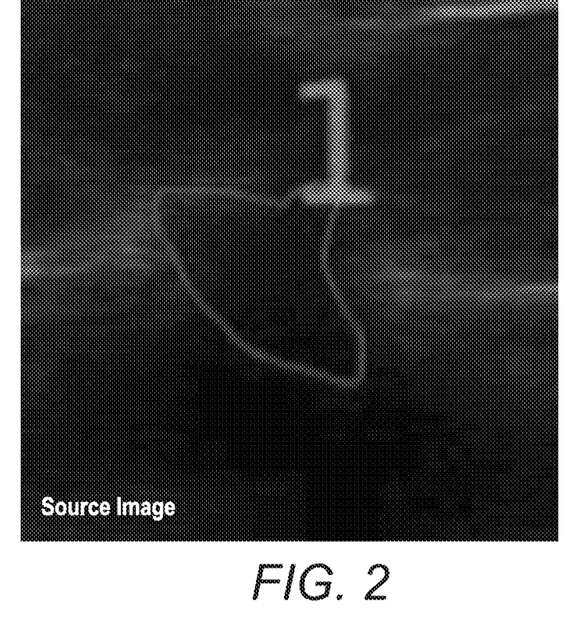
FIG. 2 is an example image illustrating an aspect of the method of FIG. 1.

With reference to FIG. 2, an example image shown (such as one received at 110 of FIG. 1) is an ultrasound image with monochrome plots of tissue density. The annotations are typically made in a color on top of the images, although here only black and white images are shown for ease of reference and reproduction. There may be multiple annotations in different colors and text labels of various sorts. This example input image, again, although shown in black and white, represents a 3 channel RGB image that contains both the underlying ultrasound and annotation information mixed together.

Figure 3:
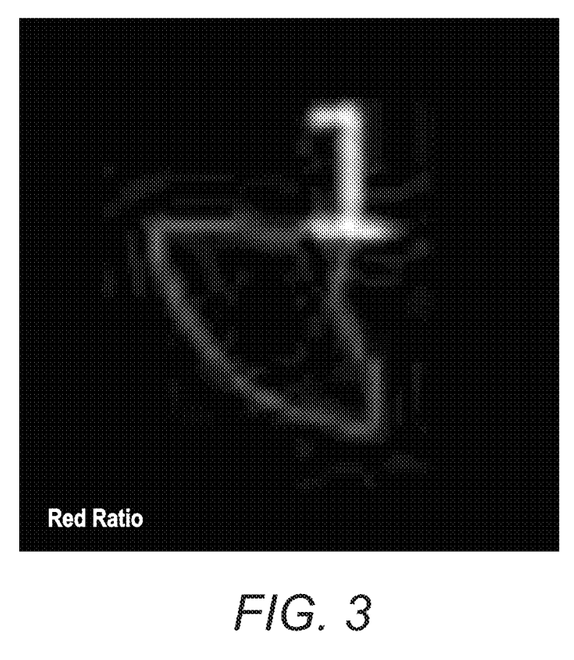
FIG. 3 is an example image illustrating an aspect of the method of FIG. 1.
Figure 4:
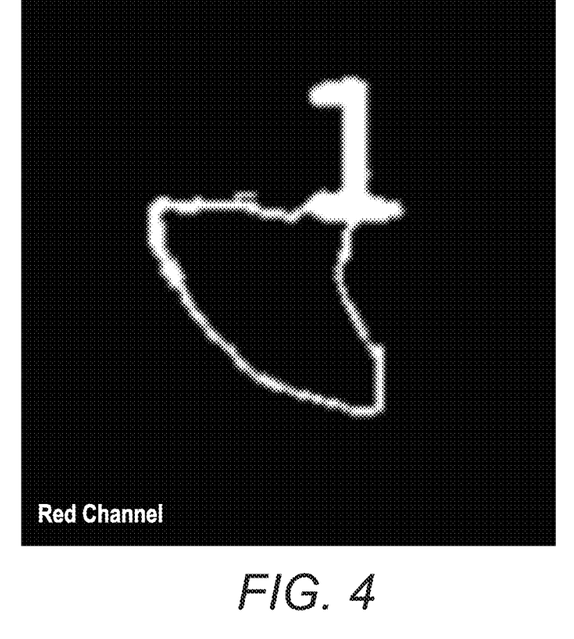
FIG. 4 is an example image illustrating an aspect of the method of FIG. 1.

With reference to FIGS. 3-4, in one example, to extract items that are annotation colored (e.g., at 120 of FIG. 1), we let I be an image represented as a two-dimensional array and red(I), blue(I) and green(I) be the red, blue and green channels of the image. We then calculate pixels with 'excess' red compared to blue and green using the following:

$$X = \mathrm{clamp}(\mathrm{red}(I) - [\mathrm{blue}(I) + \mathrm{green}(I)]/2, 0, 255)$$

FIG. 3 shows the extracted items. That is, the extracted text label "1" and the annotated boundary outline are shown.

We then select pixels that have both a minimum red energy and an excess red over blue and green using the following:

$$A = 255 \text{ if } X > 0 \text{ and } \mathrm{red}(I) > 60 \text{ else } A = 0$$

FIG. 4 shows the resulting enhancement of the extracted items achieved with this technique.

Figure 5:
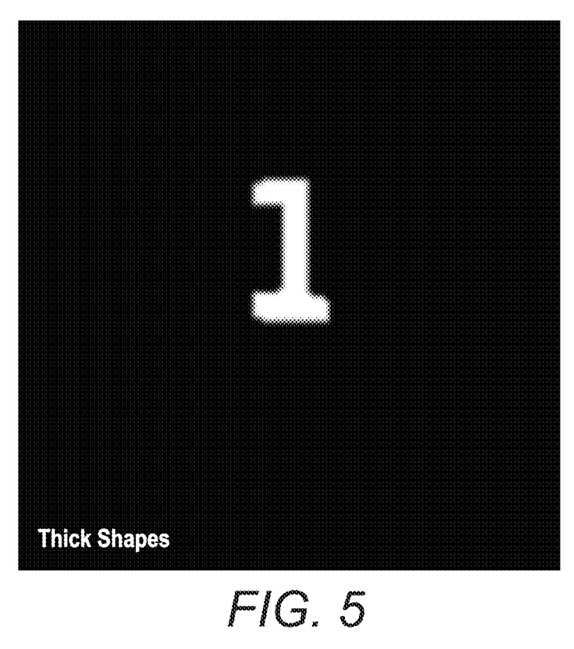
FIG. 5 is an example image illustrating an aspect of the method of FIG. 1.
Figure 6:
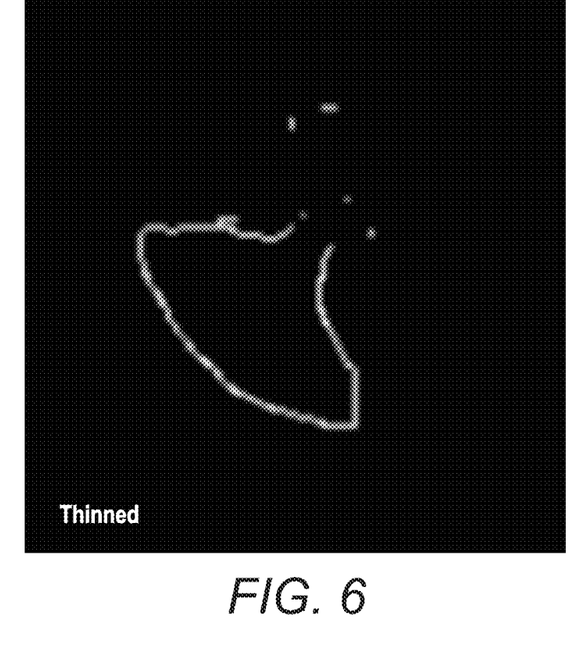
FIG. 6 is an example image illustrating an aspect of the method of FIG. 1.

With reference to FIGS. 5-6, in one example, label and regions are separated (e.g., at 130 of FIG. 1). In these images, text labels are generally thicker than the boundary of the tumor region. We can eliminate thin structures using the erosion morphological operator with a 5×5 rectangular kernel K. As shown in FIG. 5, the result is an image without thin lines that contains just the thick labels (L).

$$L = \mathrm{erode}(A, K)$$

In at least some embodiments, it may be desired to restore the "1" to its original size. In such cases, an example technique to achieve this is performing a dilation on the character.

With reference to FIG. 6, the original annotation minus the thick labels provides isolation of the region of interest boundary.

B=A-L

As shown, the boundary is then skeletonized to a single pixel to facilitate downstream operations which seek to create a single pixel wide line around the area of interest to facilitate polygon construction later.

Figure 7:
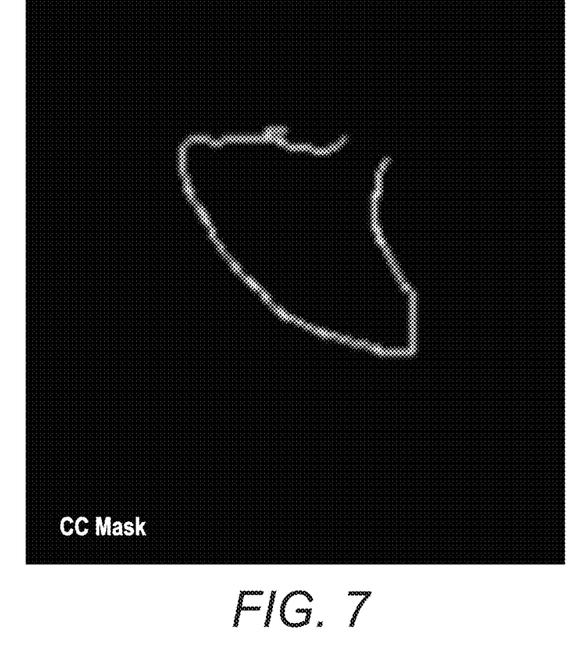
FIG. 7 is an example image illustrating an aspect of the method of FIG. 1.

With reference to FIG. 7, we then eliminate extraneous components (e.g., at 140 of FIG. 1). To do so, in at least one example, we apply a connected component algorithm to the remaining pixels and preserve only those components that are larger than a fixed threshold. Then, we take the union of significant connected components as the starting point to reconstruct the boundary. This eliminates noise from the image and allows us to deal with labels intersecting the region of interest boundary in multiple places or dropouts in annotation.

With reference to FIG. 8, in one example, a polygon is created from the remaining pixels and filled (e.g., at 150 of FIG. 1). In this regard, we convert non-zero pixels to x,y pairs; find centroid C of the x,y pairs; convert x,y coordinates to polar co-ordinates centered at the origin C; and sort the coordinates by their angle. Then, we create a closed polygon by drawing lines between pixels in order. This is a heuristic approximation but works for tumors that are approximately locally convex. We then flood fill the polygon to create a region of interest. As noted, the region of interest is, for example, provided to a machine learning system. As noted above, the region of interest could represent a variety of phenomena and could be provided to other downstream systems.

In another alternative, a polar sort of vertices from a notional center-of-mass can be thrown off when there are significant non-convexities in the region of interest. As such, an alternative embodiment is illustrated in FIG. 9.

Figure 9:
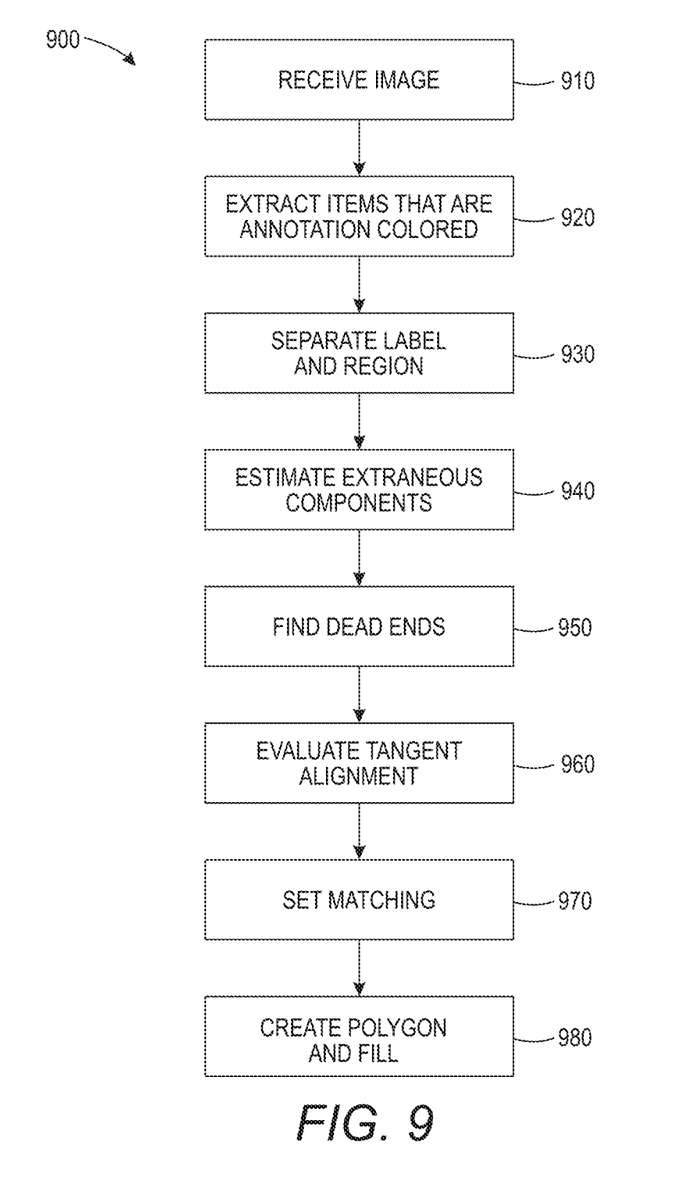
FIG. 9 is a flowchart illustrating an example method according to the presently described embodiments

With reference to FIG. 9, an example method 900 according to the presently described embodiments is illustrated. In the method 900, an image is received in the system for processing (at 910). This can be accomplished in a variety of manners, largely depending on the implementation and/or environment. Initially, items in the image that are annotation colored are extracted (at 920). This can be accomplished in a variety of manners, including those set forth in connection with FIGS. 3-4 below. Once the annotations are extracted, the label and regions are separated (at 930) using any of a variety of techniques including those techniques described below in connection with FIGS. 5-6. In at least one example, as noted above, this includes skeletonization of the boundary, which reduces the boundary to a single pixel wide line. This is useful in, for example, downstream applications such as the later tangent calculation via kernels.

Next, extraneous items are eliminated from the image (at 940). This function should eliminate unwanted noise from the image to enhance the processing. Again, this could be accomplished using a number of techniques, including those described in connection with FIG. 7.

At this point in the process, dead ends of lines in the image are found or determined (at 950). Tangent alignment is then evaluated (at 960) and set matching is used to complete missing segments (at 970) before a polygon is generated or a flood fill is accomplished. In at least one form, set matching is based on a weighted combination of distance between points and tangent alignment. Intuitively, you generally want to join points close to one another. However, in some cases, where this is ambiguous, looking at the tangents can be used to resolve the ambiguity. Then, at the appropriate point, the noted polygon is created and filled (at 980).

FIGS. 10-13 will aid in the more detailed explanation and the example embodiment of elements 950-970 of FIG. 9.

Figure 10:
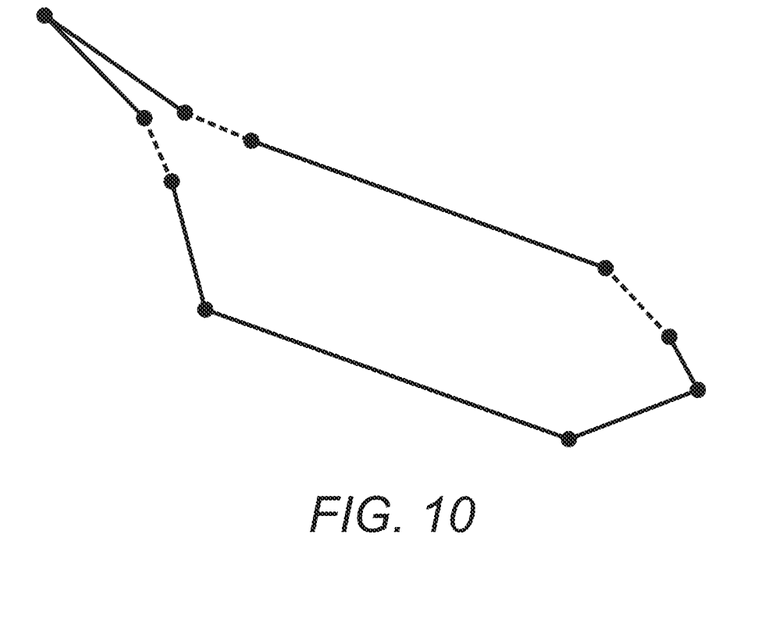
FIG. 10 is an example image illustrating an aspect of the method of FIG. 9.

With reference to FIG. 10, the input being processed (at, e.g., 950 of FIG. 9) is pixels making up line segments (solid lines). The boundary (dotted lines) should be completed.

Figure 11:
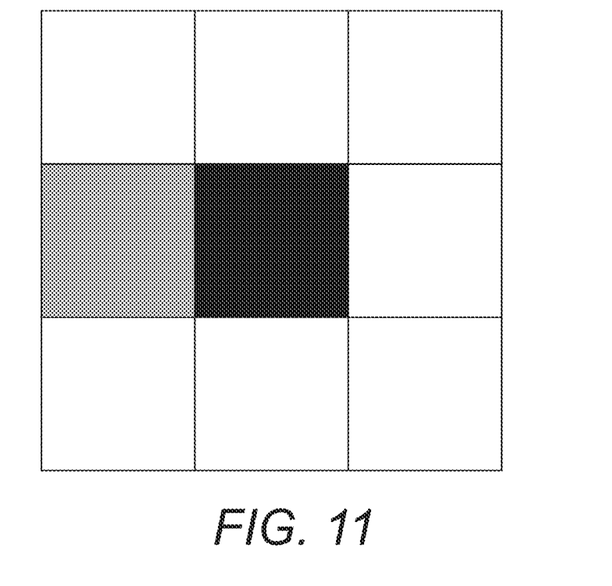
FIG. 11 is an example image illustrating an aspect of the method of FIG. 9.

With reference to FIG. 11, dead ends are found (e.g., at 950 of FIG. 9). The first step is to use a 3×3 kernel to identify dead ends. Because the region of interest boundary has been skeletonized, it is only one pixel wide. Therefore, a dead end pixel will have only one neighbor and can thus be found using a mask with a zero center and ones everywhere else. If the filter response is exactly one, a dead end has been found.

Figure 12:
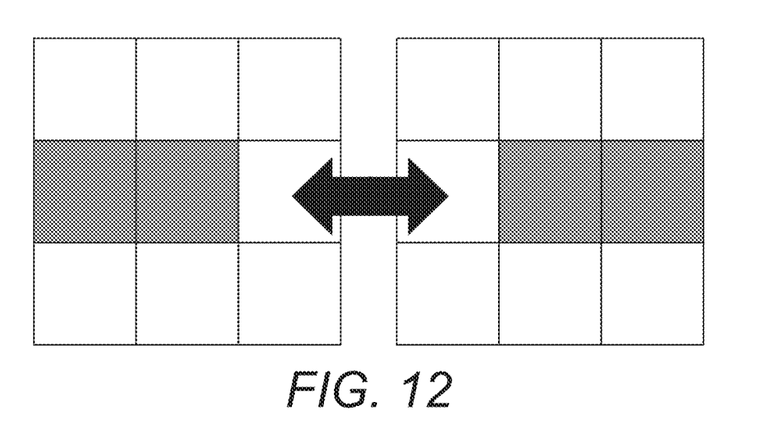
FIG. 12 is an example image illustrating an aspect of the method of FIG. 9.

With reference to FIG. 12, next, tangent alignment is evaluated (e.g., at 960 of FIG. 9). To join ends, the approach is from opposite directions. We compare the tangent approach using a lookup table to assign pairs of tangents a match. In this regard, in at least one form, a candidate pair is assigned a matching score related to how well the tangents align (perpendicular=0, parallel=1).

Figure 13:
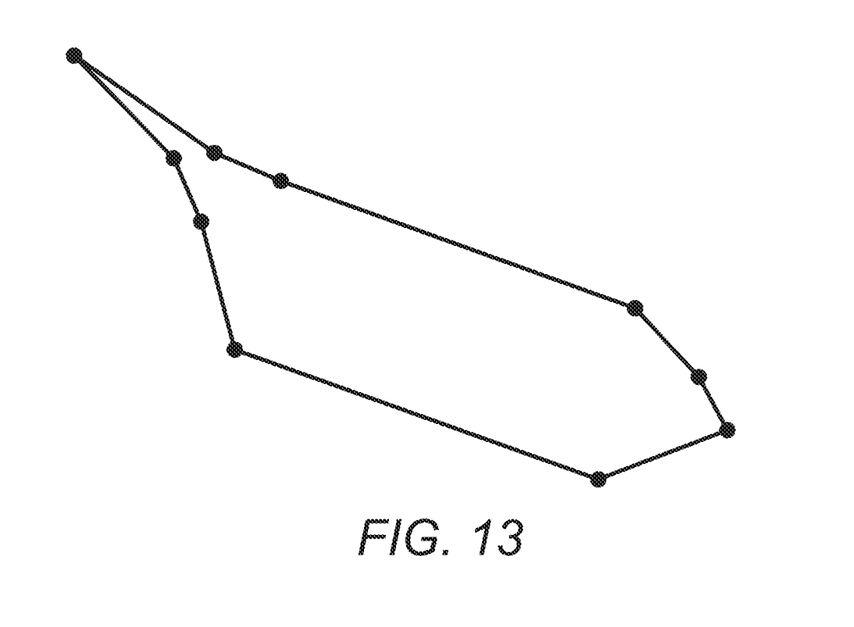
FIG. 13 is an example image illustrating an aspect of the method of FIG. 9; and, FIG. 14 is a block diagram of an example system according to the presently described embodiments.

With reference to FIG. 13, in an example, a Hungarian algorithm or bipartite set matching is implemented (e.g., at 970 of FIG. 9) using a weighted combination of distance and tangent alignment (or other connector features). Euclidean distance between x,y and tangent discrepancy between all dead end pairs are computed. Next, the approach matches together the dead ends likely to be part of a continuing boundary. Missing segments are drawn in. Last, the image is converted to polygon or flood filled. It should be appreciated that a greedy algorithm may also be used as an alternative to the Hungarian algorithm or bipartite set matching.

As with the example embodiment of FIG. 1, it will be appreciated by those of skill in the art that the output of the system, e.g., the filled-in polygon, is then provided to a machine learning system, for example, to learn the significance of the shape for a given implementation. For example, the shape may represent the shape of a tumor from an ultrasound image, or the shape of a geographic region or topological feature from a satellite image or a defect in a mechanical part. Other example implementations will also be apparent to those of skill in the art. As noted above, as an alternative or additional feature, the output of the process may be provided to a statistical or data analytics system to process any of a variety of metrics of or related to the output (e.g., the resultant mask).

Figure 14:
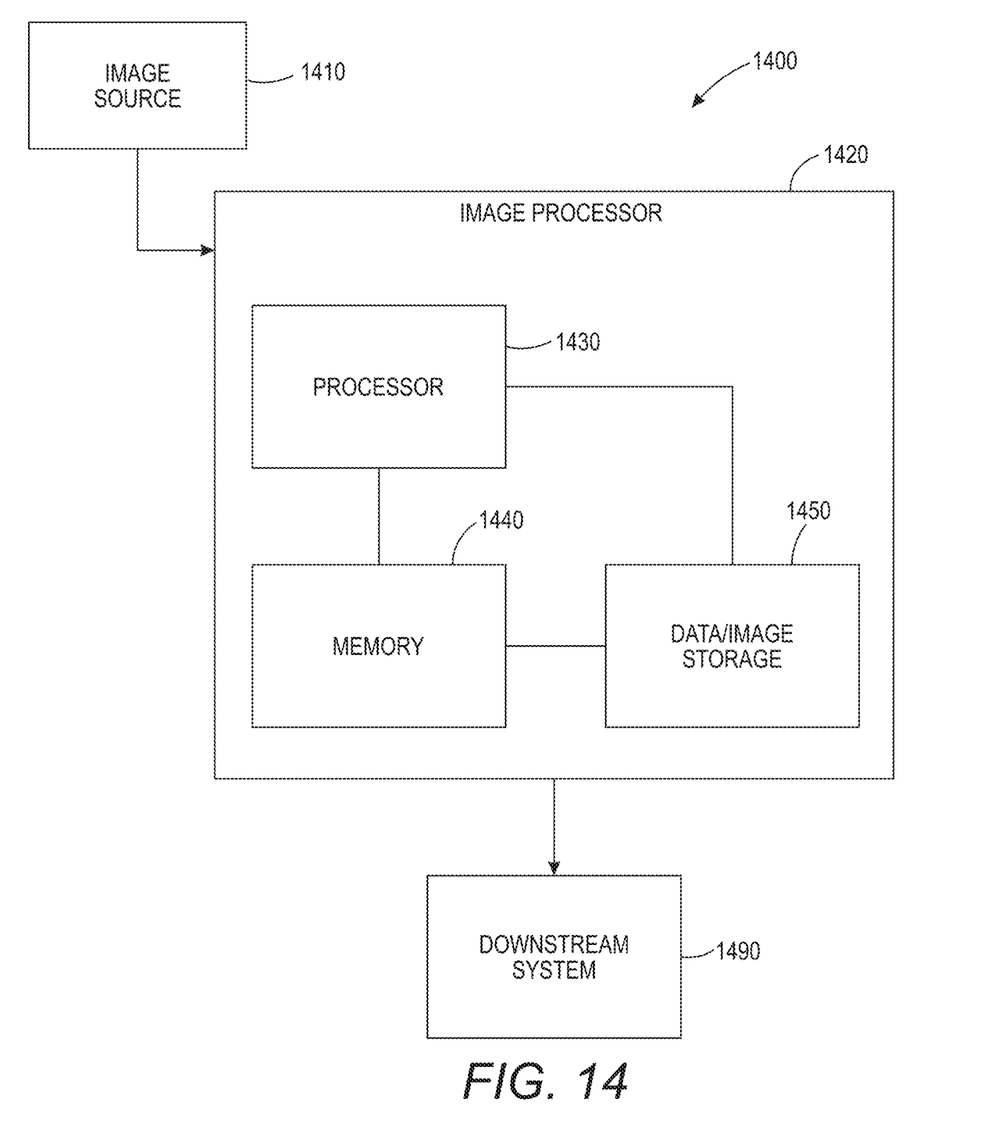

In this regard, with reference now to FIG. 14, an example system 1400 is illustrated. The system 1400 includes an image source 1410. The image source 1410 can be implemented as any of a variety of different image sources wherein human (or other) intervention results in annotations being added to the images. For example, as mentioned above, the image source 1410 may take the form of an ultrasound imaging system used in healthcare or other fields or a satellite imaging system. In the system 1400, output from the image source is provided to an image processor 1420. The image processor 1420 may take a variety of forms, but in at least one implementation, it includes at least one processor 1430, at least one memory 1440, and at least one data and/or image storage 1450. As those of skill in the art will appreciate, the memory 1440 has stored thereon instructions or code that, when executed by the processor 1430, causes the system 1400, or elements thereof, to perform specified functions. In one example, the functions of the method of FIG. 1 are performed. In another example, the functions of the method of FIG. 9 are performed. In at least one embodiment, once an image is processed according to the presently described embodiments, the image and/or suitable data are provided to a downstream system such as a machine learning system 1490, as discussed above. However, it will be appreciated that the system to which output is provided could take a variety of forms, including, for example, a statistical or data analytics system that could benefit from the data provided. In just one example, as referenced above, the region or mask of the image of FIG. 8, for example, may be useful for medical analytics (e.g., to trach tumor size, . . . etc.).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method to extract annotations from images and separate regions of interest from text labels comprising:
   receiving an image with annotations;
   extracting items from the image based on a color of the annotations;
   separating labels from regions of interest in the image;
   skeletonization of the region of interest boundary;
   eliminating extraneous components;
   creating and filling-in a polygon; and
   outputting the polygon.

2. The method as set forth in claim 1, wherein the extracting is accomplished by an excess color filter.

3. The method as set forth in claim 1, wherein the separating comprises separating the region of interest and text labels using erosion of region of interest boundary to obtain thick labels followed by subtraction of labels from the annotation.

4. The method as set forth in claim 1, wherein the eliminating extraneous components and creating a polygon comprises use of connected components to find large segments of the region of interest and polar sorting with line joining to create a polygon from the segments and fill-in.

5. The method as set forth in claim 1, wherein boundaries are reconstructed by finding dead end vertices and then doing bipartite matching between dead ends using a weighted combination of distance and tangent alignment (or other connector features) to close gaps that are close and complementary angles.

6. The method as set forth in claim 1, wherein the boundaries are reconstructed using a greedy algorithm.

7. The method as set forth in claim 1, wherein the image is an ultrasound image.

8. The method as set forth in claim 7, wherein the ultrasound image includes an image of a tumor.

9. The method as set forth in claim 1, wherein the image is a satellite image showing a geographic region or topology.

10. The method as set forth in claim 1, wherein the image is an image showing a defect in a mechanical part.

11. A system comprising:
    at least one processor; and,
    at least one memory including computer program code;
    the at least one memory and the computer program code configured to, with the at least one processor, cause the system at least to:
    receive an image with annotations;
    extract items from the image based on a color of the annotations;
    separate labels from regions of interest in the image;
    skeletonize region of interest boundary to get single pixel wide line;
    eliminate extraneous components;
    create and fill-in a polygon; and
    output the polygon.

12. The system as set forth in claim 11, wherein the at least one memory and the computer code are configured to, with the at least one processor, cause the system at least to extract items using an excess color filter.

13. The system as set forth in claim 11, wherein the at least one memory and the computer code are configured to, with the at least one processor, cause the system at least to separate the region of interest and text labels using erosion of region of interest boundary to obtain thick labels followed by subtraction of labels from the annotation.

14. The system as set forth in claim 11, wherein the at least one memory and the computer code are configured to, with the at least one processor, cause the system at least to eliminate extraneous components and creating a polygon by using connected components to find large segments of the region of interest and polar sorting with line joining to create a polygon from the segments and fill-in.

15. The system as set forth in claim 11, wherein the at least one memory and the computer code are configured to, with the at least one processor, cause the system at least to reconstruct boundaries by finding dead end vertices and then doing bipartite matching on a weighted combination of distance and tangent alignment between dead ends to close gaps that are close and complementary angles.

16. The system as set forth in claim 11, wherein the at least one memory and the computer code are configured to, with the at least one processor, cause the system at least to reconstruct boundaries by a greedy algorithm.

17. The system as set forth in claim 11, wherein the image is an ultrasound image.

18. The system as set forth in claim 17, wherein the ultrasound image includes an image of a tumor.

19. The system as set forth in claim 11, wherein the image is a satellite image showing a geographic region or topology.

20. The system as set forth in claim 11, wherein the image is an image showing a defect in a mechanical part.

* * * * *